US010951137B2

(12) United States Patent
Gennello

(10) Patent No.: US 10,951,137 B2
(45) Date of Patent: Mar. 16, 2021

(54) METHOD AND SYSTEM FOR CONVERTING SINGLE SPEED FANS TO VARIABLE SPEED FANS

(71) Applicant: DCIM Solutions, LLC, Glassboro, NJ (US)

(72) Inventor: Anthony Gennello, Marlton, NJ (US)

(73) Assignee: DCIM Solutions, LLC, Glassboro, NJ (US)

( * ) Notice: Subject to any disclaimer, the term of this patent is extended or adjusted under 35 U.S.C. 154(b) by 0 days.

(21) Appl. No.: 16/878,035

(22) Filed: May 19, 2020

(65) Prior Publication Data

US 2021/0028728 A1 Jan. 28, 2021

Related U.S. Application Data

(60) Provisional application No. 62/879,234, filed on Jul. 26, 2019.

(51) Int. Cl.
*H02P 5/68* (2006.01)
*H02P 5/74* (2006.01)

(52) U.S. Cl.
CPC ...................... *H02P 5/68* (2013.01)

(58) Field of Classification Search
CPC ...................... H02P 5/68; H02P 5/74
See application file for complete search history.

(56) References Cited

U.S. PATENT DOCUMENTS 4,580,071 A    4/1986   Nakayama
7,743,617 B2 *   6/2010   Crane ...................... F25B 49/02
                                                                               62/183
8,849,463 B2 *   9/2014   Hopkins ............. F04D 15/0281
                                                                              700/276
9,204,578 B2 *   12/2015   Smith ..................... F24F 1/0007
10,138,901 B2 *   11/2018   Benson ................. F04D 29/601
10,517,286 B2 *   12/2019   Miller ................... B05B 12/082
2009/0243535 A1 *   10/2009   Erdmann ............... H02P 25/28
                                                                              318/813

(Continued)

OTHER PUBLICATIONS

STULZ Air Technology Systems, Inc., Troubleshooting an EC Fan (Non Modbus) in a STULZ unit, http://docplayer.net/50289877-Troubleshooting-an-ec-fan-non-modbus-in-a-stulz-unit.html.

(Continued)

*Primary Examiner* — Thai T Dinh
(74) *Attorney, Agent, or Firm* — DuBois, Bryant & Campbell, LLP; William D. Wiese

(57) ABSTRACT

Legacy single speed fans are converted to variable speed fans configured to operate at reduced speeds. A conversion controller operates in conjunction with the existing controller. The conversion controller is configured with a 24 volt digital input module and a 0-10 volt analog output module. The input module is electrically connected to the 24v AC output signal wires from the existing controller. The input modules are also configured with a fan quantity selection switch to input the actual quantity of 24v AC signals for fans. The conversion controller registers the quantity of 24v AC contact signal inputs received from the existing controller, compares it to the fan quantity selected on the fan quantity selection switch, and sends a signal to the variable speed fans. The output modules are electrically connected to variable speed fan signal inputs.

9 Claims, 7 Drawing Sheets

(56) References Cited

U.S. PATENT DOCUMENTS

2011/0146307 A1* 6/2011 Ofer .................... F28B 1/06
 62/89
2015/0351335 A1* 12/2015 Abts .................... A01G 25/092
 239/728

OTHER PUBLICATIONS

Hoffman Controls, 890-DSQ Series Microprocessor Installation & Operating Instructions, http://www.hoffmancontrols.com/resources/890/890_I&O_B01.pdf.

\* cited by examiner

METHOD AND SYSTEM FOR CONVERTING SINGLE SPEED FANS TO VARIABLE SPEED FANS This non-provisional application claims priority based upon prior U.S. Provisional Patent Application Ser. No. 62/879,234 filed Jul. 26, 2019 in the name of Anthony Gennello entitled "METHODS AND SYSTEMS FOR CONVERTING SINGLE SPEED FANS TO VARIABLE SPEED FANS," the disclosures of which are incorporated herein in their entirety by reference as if fully set forth herein.

BACKGROUND OF THE INVENTION

Fans are widely used in industrial and commercial applications. In the manufacturing sector alone—such as shop ventilation, material handling and boiler applications—fans use about 78.7 billion kilowatt-hours of energy each year. This consumption represents approximately fifteen percent of the electricity used by all motors.

Banks of single speed fans are used to effectuate cooling in large heating, ventilating, air conditioning and refrigeration systems. Historically, each of the fans in the bank of fans are engaged or disengaged in response to changes in ambient temperature. Single speed fans are controlled, and capacity staged, via contact relays. The fans were either on or off and did not vary in speed. Capacity was varied based on the quantity of fans in a bank.

The configuration and quantity of fans may vary from system to system. In some instances, the fan controller may accommodate 1 through 16 fan stages. Fan staging is the grouping of fans to be powered on or off to vary capacity. For example, a heat rejection dry cooler may have 16 fans. Of those 16 fans there are 8 stages and each stage consists of 2 fans. If the air conditioning system requires half capacity from the dry cooler, the controller will power on 4 of the 8 stages so that 8 of the 16 fans will power on. In another example, a heat rejection dry cooler may have 8 fans. Of those 8 fans there are 8 stages and each stage contains 1 fan. In this instance, if the air conditioning system require 75% capacity from the dry cooler, the controller will power on 6 of the 8 stages, so that 6 of the 8 fans will power on. In a typical configuration, the fans in a fan bank are communicatively connected to a controller, and the controller will turn the fans on or off using contact relays having a 24v AC signal circuit. Those skilled in the art will appreciate that, while a 24v AC signal circuit is typical, it could also be other voltages known in the art, such as 12v, 24v, 48v, 120v or 230v. References to 24v signal circuits herein may be substituted with any other such voltage as appropriate.

This type of on/off, binary control of individual fans in a system presents a myriad of issues. For example, energy efficiency is very poor. Each time a bank of fans was engaged, the system saw a very high inrush current. In many applications, the capacity required for each bank of fans in a system is highly variable, in which case banks of fans may be staged on and off frequently. Depending on the electricity supplier, these inrush currents may affect the utility rates paid by the operator.

In addition, these frequent, full speed, starts and stops shorten the life of each fan motor in the bank, so along with operating costs, maintenance costs were high.

More importantly, this type of staged fan control leads to large increases or "jumps" in the power consumed by the fan system rather than smoothly increasing the power of the fans in the same manner in which the heat to be controlled increases.

In manufacturing, fan efficiency and reliability is critical to plant operation. For example, where fans serve material handling applications, fan failure will immediately create a process stoppage. In industrial ventilation applications, fan failure will often force a process to be shut down (although there is often enough time to bring the process to an orderly stoppage). Even in heating and cooling applications, fan operation is essential to maintain a productive work environment. Fan failure leads to conditions in which worker productivity and product quality declines. This is especially true for some production applications in which air cleanliness is critical to minimizing production defects (for example, plastics injection molding and electronic component manufacturing).

In each case, fan operation has a significant impact on plant production. The importance of fan reliability often causes system designers to design fan systems conservatively. Concerned about being responsible for under-performing systems, designers tend to compensate for uncertainties in the design process by adding capacity to fans. Unfortunately, oversizing fan systems creates problems that may increase system operating costs while decreasing fan reliability.

Fans that are oversized for their service requirements do not operate at their best efficiency points. In severe cases, these fans may operate in an unstable manner because of the point of operation on the fan airflow-pressure curve. Oversized fans generate excess flow energy, resulting in high airflow noise and increased stress on the fan and the system. Consequently, oversized fans not only cost more to purchase and to operate, they create avoidable system performance problems.

There is a need, therefore, for a system and method that alleviates these issues associated with single stage fans, such as converting single stage fans in a fan bank to variable speed fans and operating the newly installed variable speed fans in an efficient and reliable method.

SUMMARY OF THE INVENTION

In various embodiments of the present invention, a bank of legacy single speed fans is converted to variable speed fans and then the variable speed fans configured to operate at reduced speeds. The legacy fans were controlled by an existing controller. A conversion controller is used in conjunction with the existing controller. In various embodiments, the conversion controller consists of a digital input module, such as a 24 volt digital input module, and one or more output modules, such as a 0-10 volt analog output module. The digital input module is configured with a plurality of input terminals which are electrically connected to the signal wires from the existing controller and which originally terminated at the fan contact relays. Each digital input module will also have a fan stage quantity selection switch to input the actual quantity of fan capacity used by the existing controller. The fan quantity selected will match the quantity of contact relay inputs used. The analog output modules are configured with a plurality of output terminals for the varying DC signal that terminate at each variable speed fan signal input. Those skilled in the art will appreciate that, while a 0-10v DC analog signal is typical, it could also be other types of signals known in the art, such as 4-20 ma or MODBUS RS485. References to 0-10v analog signals herein may be substituted with any other such signals as appropriate.

Once configured, the installer or operator sets the quantity of 24v AC signal inputs on a fan quantity selection switch. The conversion controller will register the quantity of contact signal inputs selected, compare it to the quantity of 24v AC signals received, and send a signal through output terminals to vary the 0-10v signal to the variable speed fans.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to improved methods and systems for, among other things, improving efficiency and reliability of fan systems. The configuration and use of the presently preferred embodiments are discussed in detail below. It should be appreciated, however, that the present invention provides many applicable inventive concepts that may be embodied in a wide variety of contexts beyond fan banks in heating, ventilating, air conditioning and refrigeration systems. Accordingly, the specific embodiments discussed are merely illustrative of specific ways to make and use the invention, and do not limit the scope of the invention.

Figure 1:
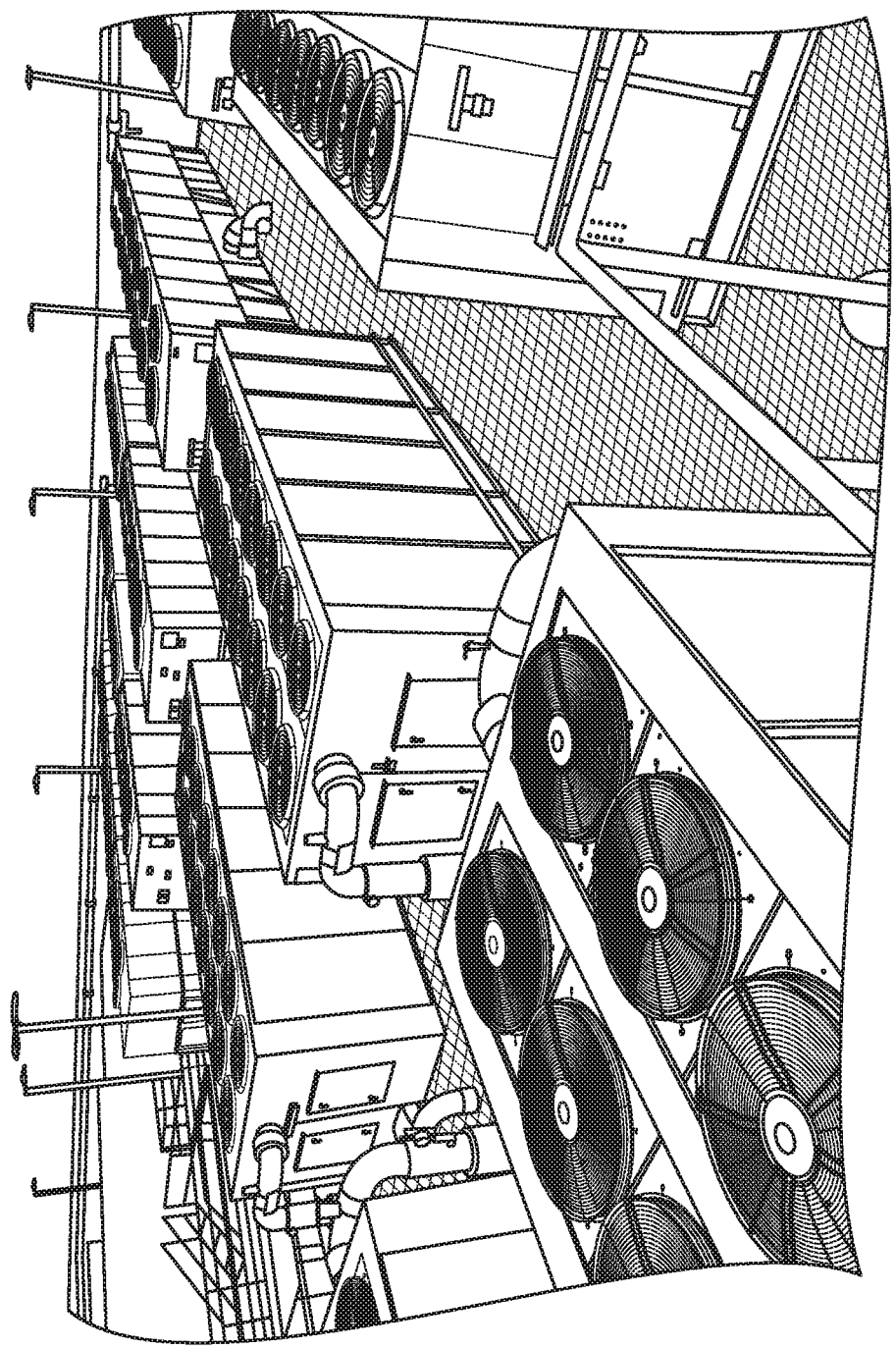
FIG. 1 shows a depiction of dry coolers, each having an array of 16 single speed fans.

The fan conversion controller simplifies the retrofit of any single speed contact relay controlled fan with a newer technology variable speed electronically commutated fan. These fans exist on, for example, many forms of heat rejection systems for air conditioning and refrigeration systems. One use of banks of single speed fans is in dry coolers, one example of which is shown in FIG. 1.

The efficient, cost-effective operation and maintenance of a fan system requires attention not only to the needs of each individual fan, but also to the system as a whole. This approach not only evaluates the performance and efficiency of each individual fan in the system, but also evaluates how each fan interacts and how the entire system performs. This approach shifts the focus from individual fan components to the performance of the total system.

Figure 2:
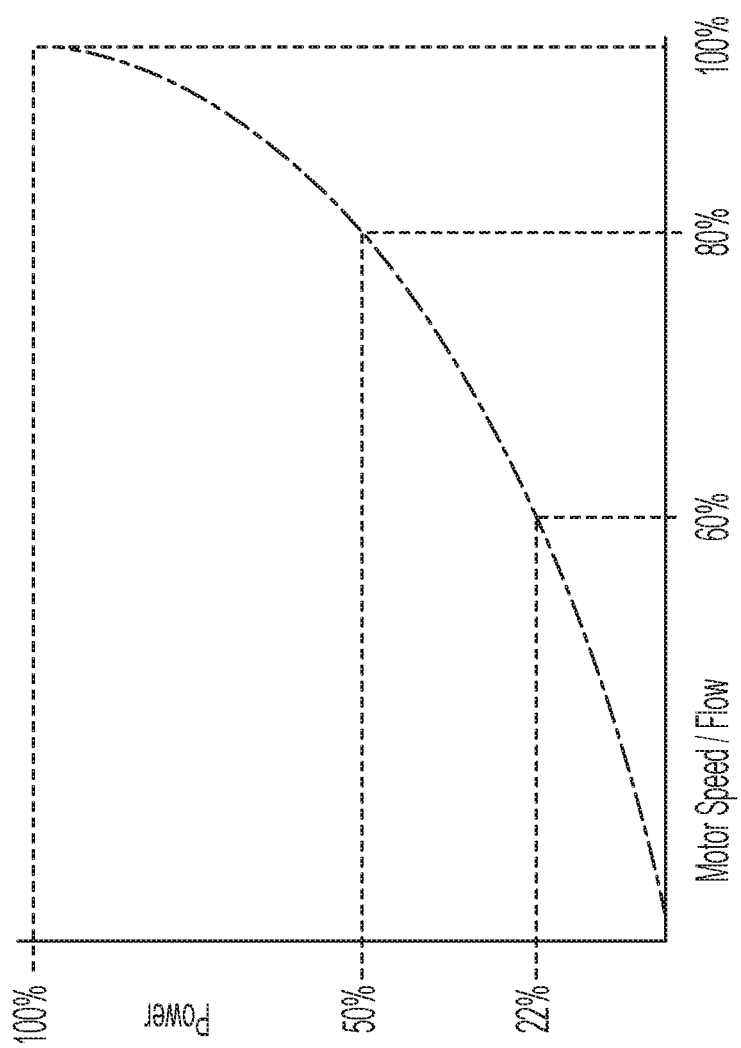
FIG. 2 is a graphical representation of the relationship between motor speed and power consumption.

It's possible to make single speed fans more efficient by converting them to variable speed fans. In fact, this conversion alone may reduce the power requirement, and therefore increase the efficiency, dramatically. More specifically, the relationship between the speed and power of a fan or a pump is governed by the cube law. Under the cube law, while air flow is proportional to the speed (e.g., 90% of fan speed equals 90% of air flow), the power necessary to operate the fan is proportional to the speed cubed. Since power costs money, a reduction in fan speed that causes an exponential (to the power of three) reduction of power may result in a significant reduction in cost. FIG. 2 shows the graphical relationship between fan speed and power consumption.

Mathematically, the calculation for the effect on power by reducing fan speed appears as follows:

$$[\text{Percent of total fan speed}]^3 = \text{Percent of total power}$$

For example, if a fan was operating at 80% of total fan speed the power usage would be calculated as:

$$[0.80]^3 = 51.2\% \text{ of total power}$$

By way of example to show power savings, a hypothetical 22 kW fan running at full load for 8 hours per day for 2 shifts Monday through Friday (8×2×5×52=4,160 hours each year) at $0.11 per kWh costs $9,060/year to run. If the fan speed slowed to 90% speed, the power consumption would be 72.9% (i.e. $0.9^3$=72.9%) of the original consumption. The savings would be $2,455/year ($9060−($9060×72.9%)).

Applying this approach to a system of fans amplifies this effect. For example, a bank of legacy single speed fans may be converted to variable speed fans and then the variable speed fans configured to operate at reduced speeds. In this example, ten single speed fans are positioned in a fan bank and half capacity is required. Five of the fans would be switched on and the other five would be left off. Switching only half of the fans on would only consume 50% of the power required to operate the entire bank of fans. However, if the fans are converted to variable speed fans, all ten fans could be set to operate at 50% air flow. The power required to operate the variable speed fans at 50% speed would be 12.5% ($0.5^3$=0.125). The difference between power required to operate a bank of single speed fans at 50% air flow (50%) and the power required to operate a bank of variable speed fans at 50% air flow (12.5%) is 37.5% (i.e., 50%−12.5%). In other words, a conversion from single speed fans to variable speed fans would result in cost savings of 37.5%.

The efficiencies realized with an array of EC fans is significant for other reasons as well. For example, AC fans staged at half capacity will only provide airflow draw over one-half of the coil. However, having EC fans all running at one-half air flow will provide coverage over 100% of the coil, and this better coil coverage equates to better overall system effectiveness and efficiency.

Figure 3:
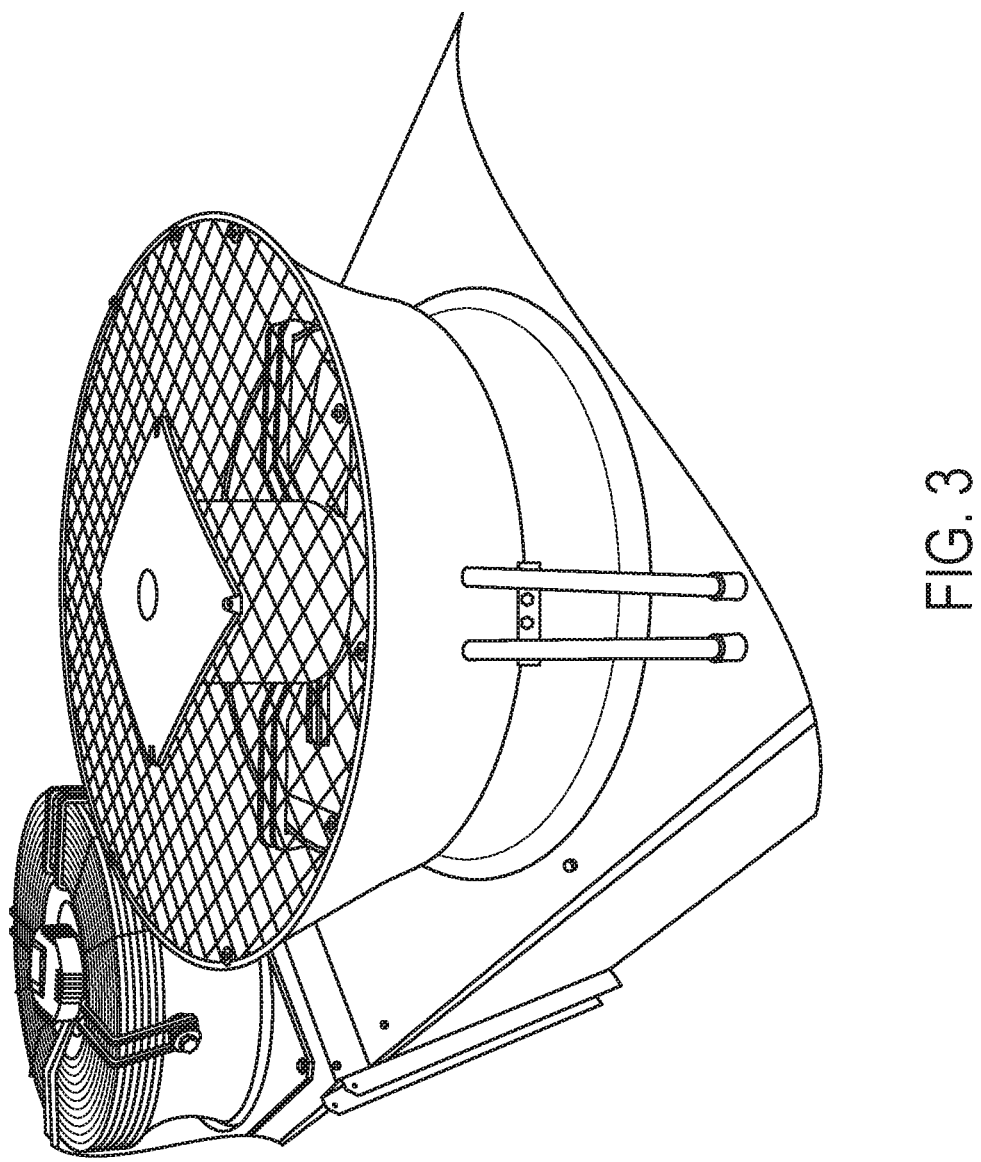
FIG. 3 is a depiction of a variable speed electronically commutated fan.

In some embodiments, the variable speed fans are configured with electronically commutated (EC) motors. An EC motor is designed to run on an alternating current (AC) power supply, but it, in fact, bears a closer resemblance to a direct current (DC) motor. It is essentially a permanent magnet, brushless DC motor that incorporates on-board electronics. The added electronics allow the EC motor to combine the best features from both AC and DC motors, and then improve on them. For this reason, a variable speed fan with an EC motor is an excellent choice for this application, and a fan with an EC motor will be referred to as an EC fan herein. One example of an EC fan is shown FIG. 3.

Those skilled in the art will appreciate that older AC fans may have a single power feed to the unit that is distributed to contact relays which is then routed to each fan. When retrofitting a single speed AC fan unit with variable speed EC fan unit, it will be necessary to supply a new power source, such as a circuit breaker panel, with a circuit breaker and power for each new EC fan.

Also, while a single speed AC fans may be turned on or off by the fan's power source in a binary manner, EC fans require a full-time power source and signal to command the fan speed. The fan speed signal is variable and may consist of 0-10v, 4-20 ma, MODBUS RS485 protocols or other protocols which are or may become known in the art. An EC fan may be damaged if it is powered on and off like an AC fan.

Systems and methods known in the art for adapting EC fans to a single speed varying capacity system are expensive and complicated programmable controllers. Typically, these controllers are "stand alone" in nature and require their own sensors that must be programmed in order to interact with the existing controller. By contrast, the controller used in the present invention simply integrates with the existing contact relay controller.

Figure 4:
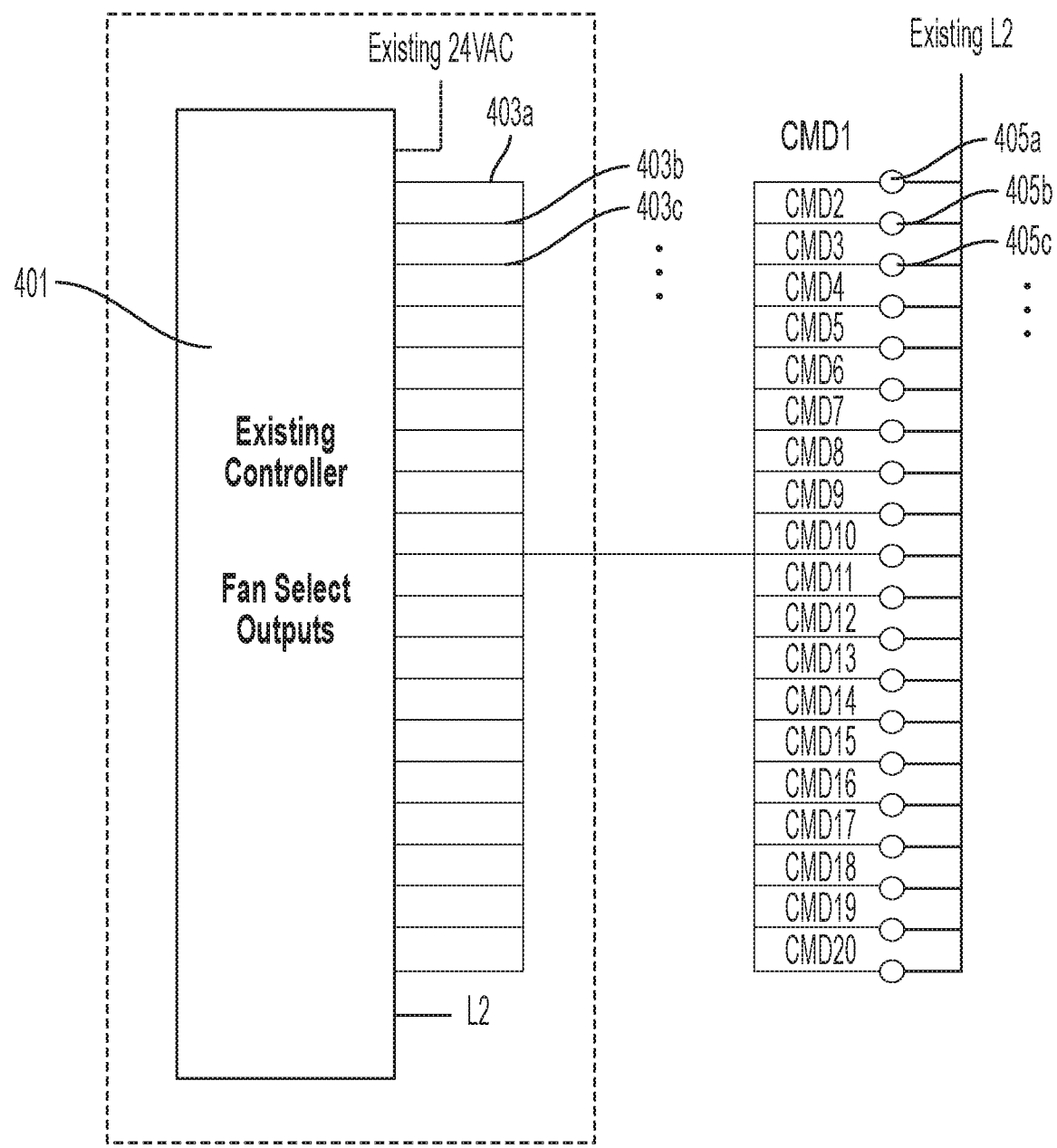
FIG. 4 is a schematic drawing of a controller for a bank of single speed fans.

Referring now to FIG. 4 which shows an existing contact relay controller 401. The controller 401 is configured with a plurality of 24v AC signal wires 403a, 403b which terminate at the fan contact relays 405a, 405b. The controller 401 will turn the fans on or off by sending a signal through the 24v AC signal wire 403a, 403b. For example, if there are 20 fans controlled through the fan contact relays 405a, 405b and the air conditioning system require 75% capacity from the dry cooler, the controller 401 will send a signal through the 24v AC signal wire 403a, 403b to the fan contact relays 405a, 405b to instruct 15 of the 30 fans to power on.

Figure 5A:
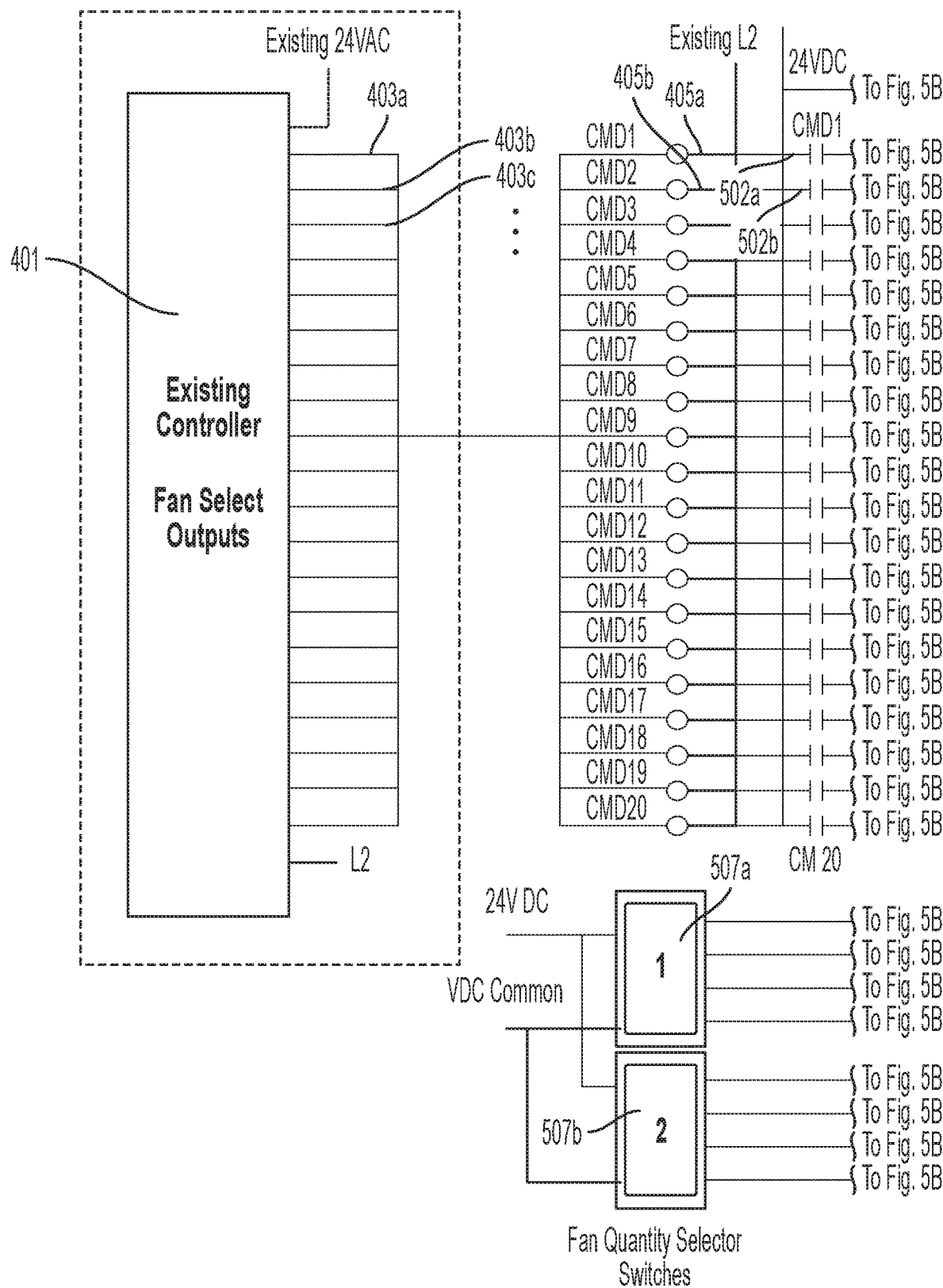
FIGS. 5A and 5B are schematic drawings of one embodiment of the controller of the present invention.
Figure 5B:
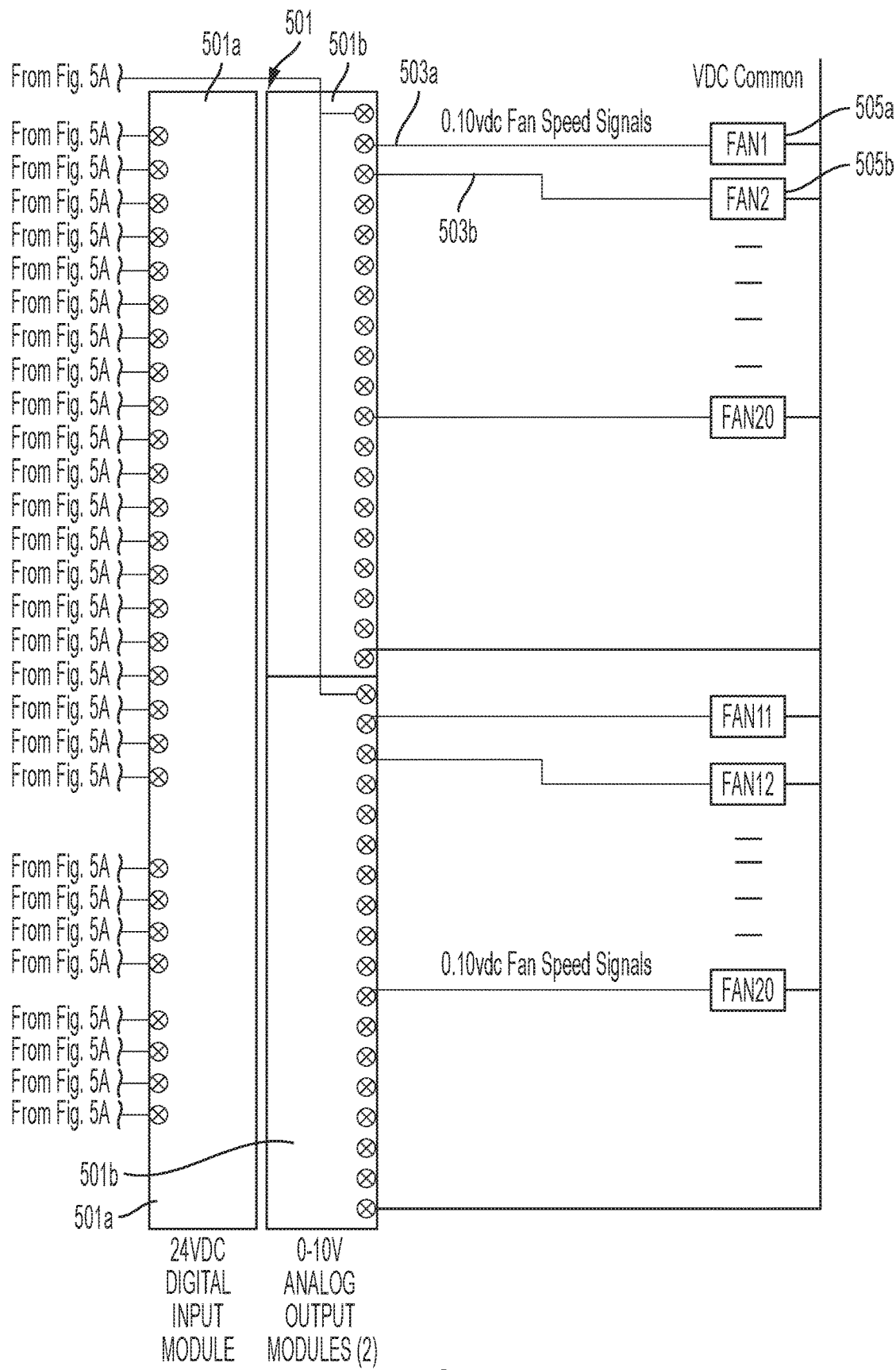

Referring now to FIGS. 5A and 5B which show one embodiment of the conversion controller 501 of the present invention. The conversion controller 501 is used in conjunction with the existing controller 401. In this embodiment, the conversion controller consists of a 24 volt digital input module 501a and two 0-10 volt analog output modules 501b, 501c. The 24 volt digital input module 501a is configured with a plurality of input terminals 502a, 502b which are electrically connected to the 24v AC signal wires 405A, 405b from the existing controller 401 and which originally terminated at the fan contact relays 405a, 405b. The 0-10 volt analog output modules 501b, 501c are configured with a plurality of output terminals 503a, 503b for the varying 0-10v DC signal that terminate at each EC fan signal input 505a, 505b. The conversion controller 501 will have a power input of a type known in the art. 24 volt digital input module 501a will also have a fan quantity selection switch 507a, 507b to input the actual quantity of fans that would have been controlled by the existing controller.

Once the system is configured as described above, the installer or operator sets the quantity of fans on each fan quantity selection switch 507a, 507b. The conversion controller 501 will register the quantity of contact signal inputs received through the existing controller 401, compare it to the fan quantity selected on the fan quantity selection switch 507a, 507b, and send a signal through output terminals 503a, 503b to vary the 0-10v signal to the EC fans 505a, 505b. For example, if ten fans are selected as the quantity of fan on fan quantity selection switch 507a an existing controller 401 sends a signal for two fans to power on through fan 24v AC contact relay 405a, the conversion controller 501 receives input through input terminal 502a that two of ten fans are requested to operate which equates to 20% capacity. The conversion controller 501 will then send a signal through output terminal 503a. That signal will be a 2v signal, because 2v is 20% of 10v, through the output terminal 503a to the EC fan 505a, 505b which indicates 20% fan speed, and all EC fans 505a, 505b adjust their motor speeds to 20% capacity.

Those skilled in the art will appreciate that it does not matter which of the fan contact relays 405a, 405b are requested to operate. Regardless of which fan contact relays 405a, 405b the existing controller 401 instructs to operate, the conversion controller 501 will read the quantity of signals and divide it by the fan quantity specified by the fan quantity selection switch 507a, 507b to determine percentage of requested capacity.

It will also be apparent to those skilled in the art that references to "fans" herein may be similarly references to "fan stages" and that a fan stage, rather than a single fan, may be communicatively connected to a contact relay. For example, the installer or operator sets the quantity of fan stages on each fan stage quantity selection switch 507a, 507b. The conversion controller 501 will register the quantity of contact signal inputs received through the existing controller 401, compare it to the fan stage quantity selected on the fan stage quantity selection switch 507a, 507b, and send a signal through output terminals 503a, 503b to vary the 0-10v signal to the EC fans 505a, 505b.

Figure 6:
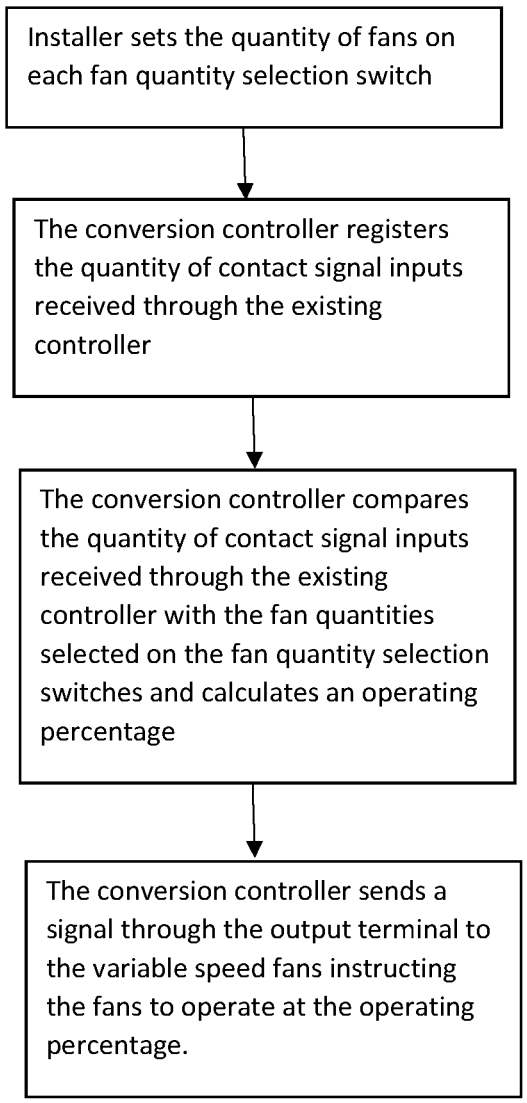
FIG. 6 is a flow diagram showing the comparison of the contact signal inputs to the number of fans selected to calculate an operating percentage.

Referring now to FIG. 6 which first shows that the installer sets the quantity of fans on each fan quantity selection switch. The conversion controller then registers the quantity of contact signal inputs received through the existing controller. The conversion controller then compares the quantity of contact signal inputs received through the existing controller with the fan quantities selected on the fan quantity selection switches and calculates an operating percentage, at which point the conversion controller sends a signal through the output terminal to the variable speed fans instructing the fans to operate at the calculated operating percentage.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for improving fan efficiency known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112(f) unless the words "means for" or "step for" are explicitly used in the particular claim.

I claim:

1. A system for controlling variable speed fans, comprising:
    a first controller for controlling a plurality of single speed fans by sending a first signal through a first plurality of signal wires;
    a second controller configured with a digital input module electrically connected to an analog output module;
        the digital input module having a plurality of input terminals configured to receive the first signal sent through the first plurality of signal wires;
        the analog output module having a plurality of output terminals configured to send second signals to a plurality of variable speed fans;
    a fan quantity selection switch electrically connected to the analog output module, the fan quantity selection switch configured to receive a total number of fans comprising the plurality of single speed fans controlled by the first controller;
    wherein when an input designating a number of fans of the plurality of single speed fans to be activated is entered into the first controller, an operating percentage is calculated as the number of fans of the plurality of single speed fans to be activated divided by the total number of fans comprising the plurality of single speed fans controlled by the first controller, and the second controller sends the second signals to the plurality of variable speed fans, thereby activating the fans at the operating percentage.

2. The system for controlling variable speed fans of claim 1, wherein the first plurality of signal wires are 24 volt AC signal wires.

3. The system for controlling variable speed fans of claim 1, wherein the first plurality of signal wires are 12 volt AC signal wires.

4. The system for controlling variable speed fans of claim 1, wherein the digital input module is configured to receive 12 volt AC signals.

5. The system for controlling variable speed fans of claim 1, wherein the digital input module is configured to receive 24 volt AC signals.

6. The system for controlling variable speed fans of claim 1, wherein the analog output module is configured as a 0-10 volt analog output module.

7. The system for controlling variable speed fans of claim 1, wherein the analog output module is configured as a 4-20 ma analog output module.

8. The system for controlling variable speed fans of claim 1, wherein the plurality of variable speed fans are configured to receive 0-10 volt analog input signals.

9. The system for controlling variable speed fans of claim 1, wherein the plurality of variable speed fans are configured to receive 4-20 ma analog input signals.

* * * * *